(12) United States Patent
Adel

(10) Patent No.: US 10,922,742 B2
(45) Date of Patent: Feb. 16, 2021

(54) LOCATING PRODUCTS USING TAG DEVICES

(71) Applicant: Verizon Patent and Licensing Inc., Arlington, VA (US)

(72) Inventor: Michael A. Adel, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 14/671,616

(22) Filed: Mar. 27, 2015

(65) Prior Publication Data
US 2016/0284014 A1 Sep. 29, 2016

(51) Int. Cl.
| | | |
|---|---|---|
| *G06Q 30/06* | (2012.01) | |
| *G06Q 30/02* | (2012.01) | |
| *G06Q 20/18* | (2012.01) | |
| *G06Q 10/08* | (2012.01) | |
| *G06Q 20/32* | (2012.01) | |
| *G06Q 20/20* | (2012.01) | |

(52) U.S. Cl.
CPC ....... *G06Q 30/0639* (2013.01); *G06Q 10/087* (2013.01); *G06Q 20/18* (2013.01); *G06Q 20/20* (2013.01); *G06Q 20/32* (2013.01); *G06Q 30/0269* (2013.01)

(58) Field of Classification Search
CPC . G06Q 30/0207–0277; G06Q 30/0639; G06Q 10/087; G06Q 20/18; G06Q 20/20; G06Q 20/32
See application file for complete search history.

(56) References Cited

U.S. PATENT DOCUMENTS

| | | | | |
|---|---|---|---|---|
| 6,025,780 A | * | 2/2000 | Bowers | G06K 19/0701 340/572.3 |
| 6,484,182 B1 | * | 11/2002 | Dunphy | G06Q 10/06 707/999.102 |
| 7,587,502 B2 | * | 9/2009 | Crawford | A63F 13/12 709/229 |
| 7,711,586 B2 | * | 5/2010 | Aggarwal | G06Q 10/10 705/5 |

(Continued)

OTHER PUBLICATIONS

Wikipedia, "Near field communication," http://en.wikipedia.org/wiki/Near_field_communication#Comparison_with_Bluetooth, Mar. 27, 2015, 17 pages.

(Continued)

*Primary Examiner* — David J Stoltenberg
*Assistant Examiner* — Michael J Cross

(57) ABSTRACT

A device may detect location information. The location information may indicate a location of the device. The device may receive product search information that identifies one or more criteria for searching inventory information. The inventory information may be associated with the location, and may include information regarding products. The device may cause a search of the inventory information to be performed, based on the product search information, to determine compatible products. The device may determine one or more selected products of the compatible products. The one or more selected products may be selected for purchasing. The device may locate tag devices associated with the one or more selected products to guide a user to a physical location of the tag devices. The device may provide purchase information associated with the one or more selected products.

20 Claims, 9 Drawing Sheets

(56) References Cited

U.S. PATENT DOCUMENTS

| | | | | |
|---|---|---|---|---|
| 8,166,062 B1* | 4/2012 | McElroy | | G06F 16/951 |
| | | | | 707/769 |
| 8,897,742 B2* | 11/2014 | Johnson | | H04H 20/16 |
| | | | | 455/404.2 |
| 2002/0002600 A1* | 1/2002 | Yamada | | G06F 16/9537 |
| | | | | 709/219 |
| 2005/0149414 A1* | 7/2005 | Schrodt | | G06Q 10/087 |
| | | | | 705/29 |
| 2006/0248815 A1* | 11/2006 | Tomoyasu | | E01D 19/04 |
| | | | | 52/167.1 |
| 2007/0138268 A1* | 6/2007 | Tuchman | | G06Q 30/02 |
| | | | | 235/383 |
| 2008/0074264 A1* | 3/2008 | Sharpe | | G06Q 30/02 |
| | | | | 340/572.1 |
| 2008/0231448 A1* | 9/2008 | Fowler | | G08B 13/246 |
| | | | | 340/572.1 |
| 2008/0248815 A1* | 10/2008 | Busch | | H04W 4/02 |
| | | | | 455/456.5 |
| 2008/0301102 A1* | 12/2008 | Liang | | G06Q 30/02 |
| 2009/0179753 A1* | 7/2009 | Bonner | | G01S 11/06 |
| | | | | 340/539.32 |
| 2009/0182499 A1* | 7/2009 | Bravo | | G01C 21/20 |
| | | | | 701/408 |
| 2010/0262554 A1* | 10/2010 | Elliott | | G01C 21/20 |
| | | | | 705/323 |
| 2012/0005023 A1* | 1/2012 | Graff | | G06Q 30/0261 |
| | | | | 705/14.58 |
| 2012/0218089 A1* | 8/2012 | Hill | | H04M 1/72572 |
| | | | | 340/407.1 |
| 2012/0239504 A1* | 9/2012 | Curlander | | G06Q 30/02 |
| | | | | 705/14.66 |
| 2013/0218721 A1* | 8/2013 | Borhan | | G06Q 30/02 |
| | | | | 705/26.41 |
| 2014/0019200 A1* | 1/2014 | Argue | | G06Q 30/02 |
| | | | | 705/7.29 |
| 2014/0214620 A1* | 7/2014 | Hulth | | G06Q 10/087 |
| | | | | 705/26.61 |
| 2014/0278789 A1* | 9/2014 | Singh | | G06Q 30/0217 |
| | | | | 705/7.32 |
| 2014/0304075 A1* | 10/2014 | Dillingham | | G06Q 30/0207 |
| | | | | 705/14.58 |
| 2014/0324624 A1* | 10/2014 | Ward | | H04W 4/21 |
| | | | | 705/26.7 |
| 2015/0057919 A1* | 2/2015 | Shoarinejad | | G01S 13/878 |
| | | | | 701/409 |
| 2015/0269642 A1* | 9/2015 | Cai | | G06Q 30/0613 |
| | | | | 705/14.49 |
| 2016/0148225 A1* | 5/2016 | Ku | | G06Q 30/0202 |
| | | | | 705/7.31 |

OTHER PUBLICATIONS

Wikipedia, "Radio-frequency identification," http://en.wikipedia.org/wiki/Radio-frequency_identification#Tags, Mar. 27, 2015, 28 pages.

* cited by examiner

LOCATING PRODUCTS USING TAG DEVICES

BACKGROUND

A user may purchase products at a retail store, a mall kiosk, or the like. The user may use a user device (e.g., a smart phone, a tablet computer, etc.) to compare prices, qualities, etc. of the products.

DETAILED DESCRIPTION OF PREFERRED EMBODIMENTS

The following detailed description of example implementations refers to the accompanying drawings. The same reference numbers in different drawings may identify the same or similar elements.

A user may want to locate and/or purchase a product at a location (e.g., a retail store, a mall kiosk, etc.). The retail store may employ workers to facilitate the locating and/or purchasing (e.g., by guiding the user to the product, by scanning the product to be purchased, by deactivating a security element associated with the product, etc.). However, the location may be large, may include many similar products (e.g., products associated with similar designs, similar prices, etc.), and/or may employ many workers to facilitate the locating and/or purchasing. Further, the location may incur significant costs to employ and/or train the many workers.

Implementations described herein may assist a user to locate and/or purchase a product without assistance from a worker. A user device associated with the user may determine product search information that describes a product that the user wants to locate and/or purchase. The user device may determine compatible product information that describes compatible products (e.g., based on the product search information and/or based on inventory information that describes products offered for sale at the location). The user device may determine a selected product of the compatible products. The user device may broadcast a locator signal to locate the selected product, and may receive a tag signal broadcasted by a tag device associated with the selected product. Based on the tag signal and/or the locator signal, the user device may locate the tag device and/or the selected product, may guide the user to the selected product, and/or may provide an interface to facilitate purchasing of the selected product by the user.

In this way, the user device may guide the user to the selected product, may reduce a quantity of workers required to facilitate the locating and/or purchasing, may target advertisements and/or promotions to the user based on the product search information, and/or may improve a user experience of shopping for the product in the retail store.

Figure 1A:
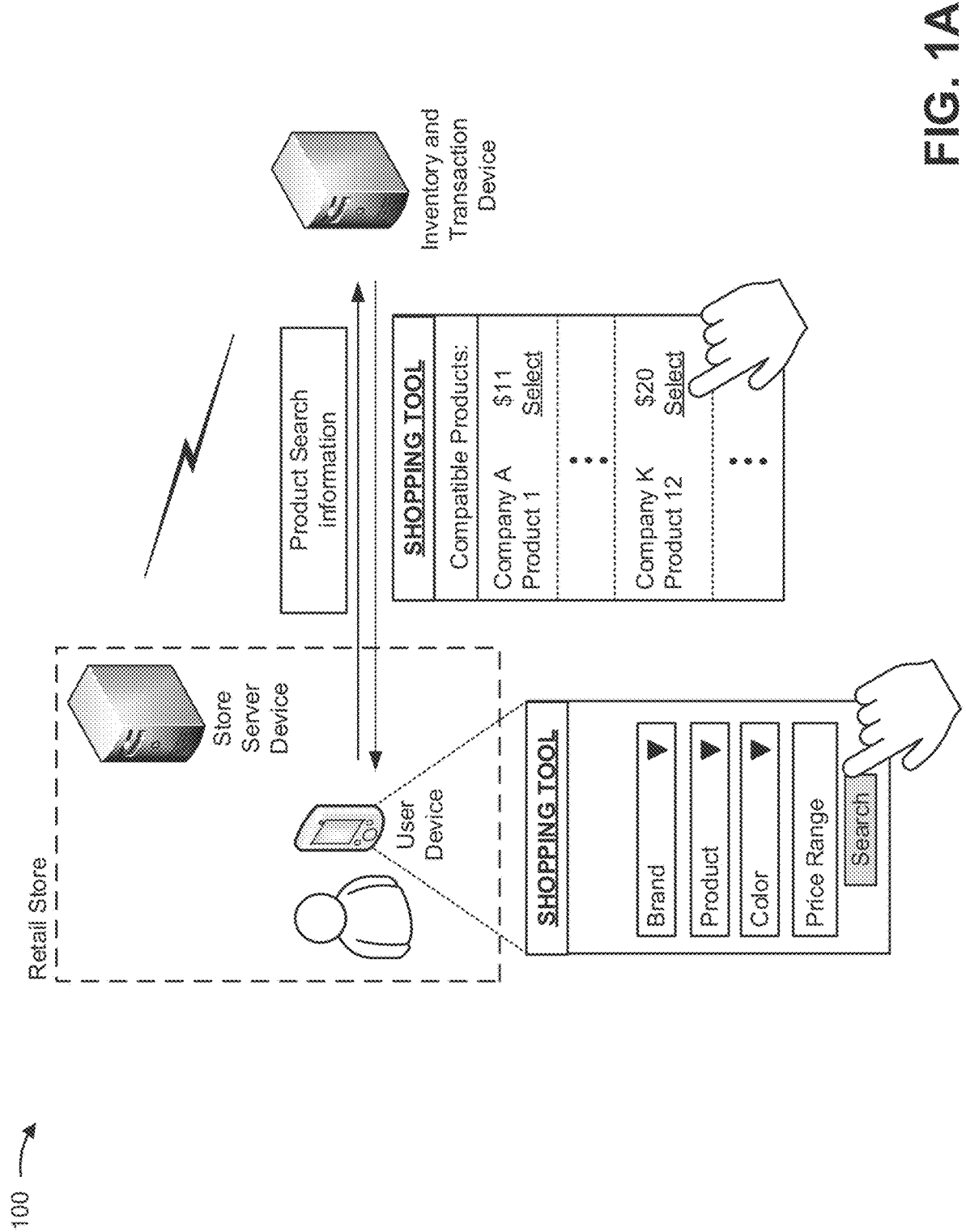
FIGS. 1A and 1B are diagrams of an overview of an example implementation described herein.
Figure 1B:
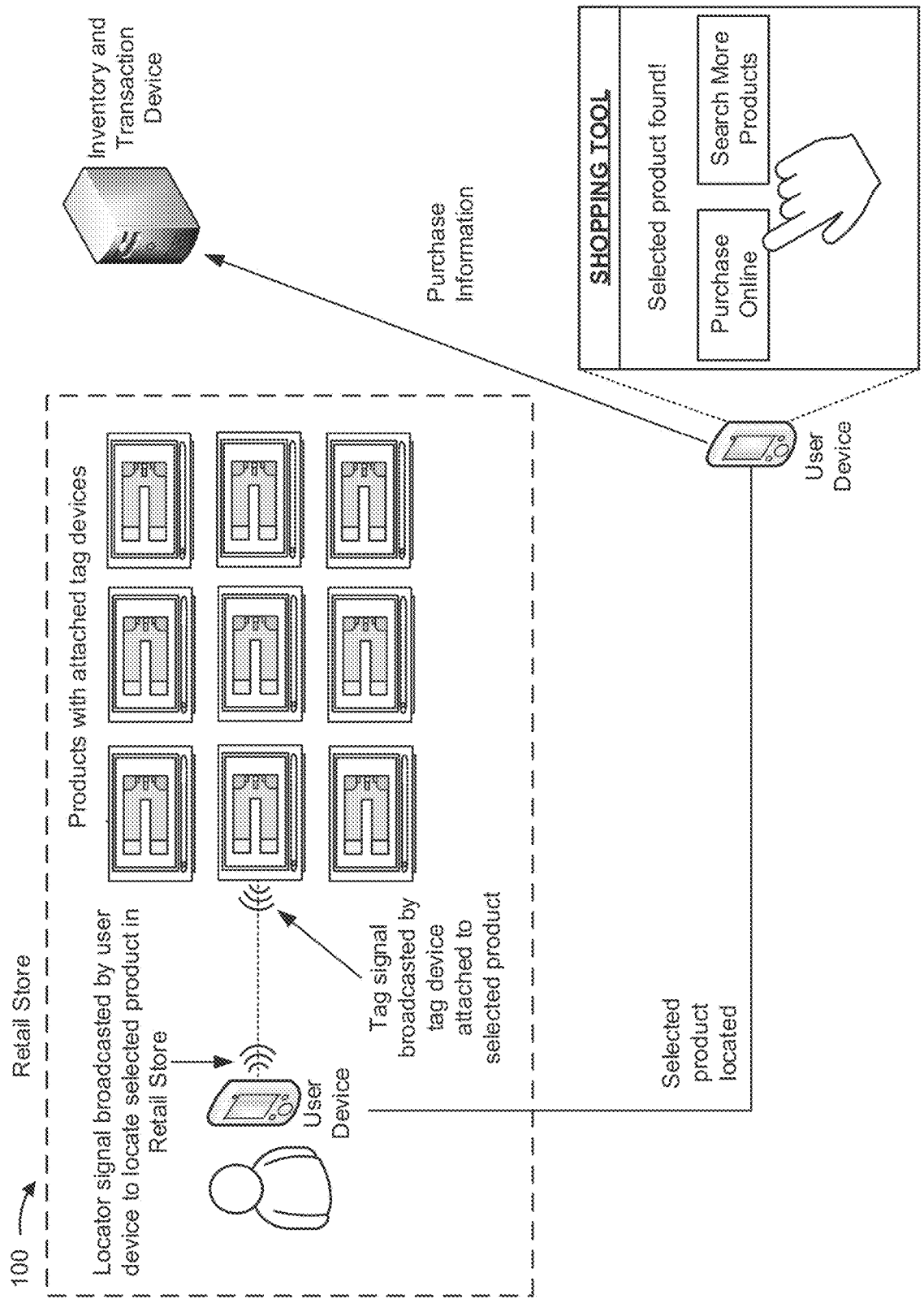

FIGS. 1A and 1B are diagrams of an overview of an example implementation 100 described herein. As shown in FIG. 1A, a user device located at a retail store may provide an interface for a shopping tool (e.g., shown as SHOPPING TOOL). As further shown, the shopping tool may receive product search information (e.g., shown as a brand selection menu, a product selection menu, a color selection menu, and a price range selection menu). Assume that a user of the user device inputs the product search information to cause a device to perform a search for compatible products (e.g., for one or more products that match the product search information that are offered for sale at the location).

As shown, the user device may provide, to an inventory and transaction device, product search information (e.g., for the inventory and transaction device to perform a search for the compatible products). Assume that the inventory and transaction device communicates with a store server device associated with the retail store to perform the search for the compatible products. As shown, assume that the inventory and transaction device provides information identifying the compatible products to the user device, and assume that the user device provides the compatible products for display to the user. As shown, the user device may receive an interaction (e.g., from the user) to indicate a selected product of the compatible products.

As shown in FIG. 1B, the user device may broadcast a locator signal to locate the selected product at the location. Assume that a tag device attached to the selected product receives the locator signal and broadcasts a tag signal based on receiving the locator signal. As shown, assume that the user device locates the selected product based on receiving the tag signal. Assume further that the user device guides the user to the selected product (e.g., by providing, via the shopping tool, a map that indicates a location of the selected product). As shown, the user device may provide, via a user interface of the shopping tool, a purchase interface to facilitate purchasing the selected item. As shown, assume that the user device receives an interaction with the purchase interface to cause the user device to purchase the selected item. As shown, assume that, based on receiving the interaction to cause the user device to purchase the selected item, the user device provides purchase information to the inventory and transaction device. Assume that the inventory and transaction device performs an action to facilitate purchasing of the selected product.

In this way, a user device may guide a user in a retail store to locate and/or purchase a selected product based on broadcasted signals. By enabling the user to search for and/or select the selected product via a user interface of the user device, the user device may provide an additional vector via which to provide advertisements and/or promotions to the user. By guiding the user to locate and/or purchase the selected product, the user device may reduce a quantity of workers required to facilitate locating and/or purchasing the selected product in the retail store.

Figure 2:
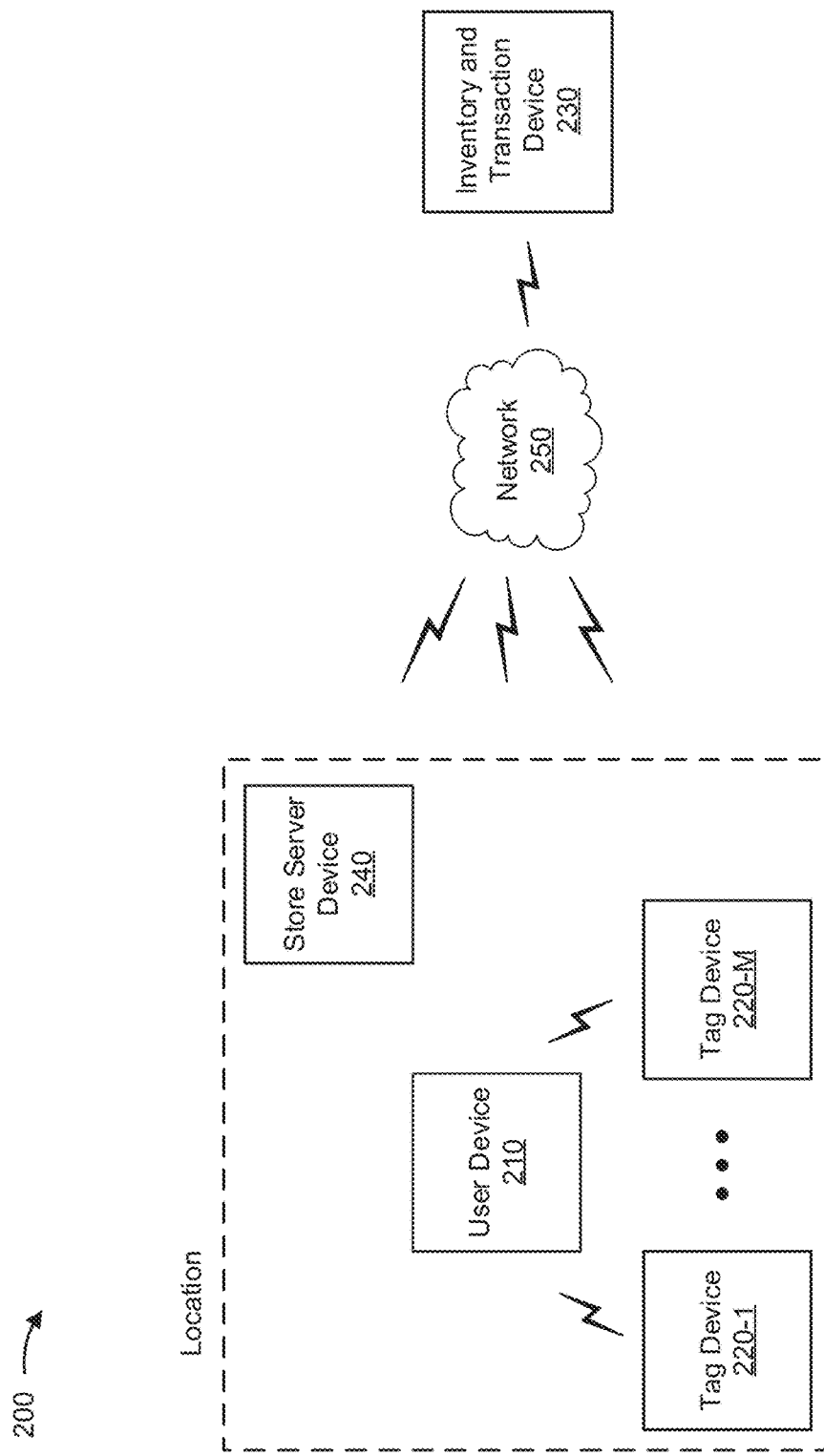
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more tag devices 220-1 through 220-M (M≥1) (hereinafter referred to collectively as "tag devices 220," and individually as "tag device 220"), an inventory and transaction device 230, a store server device 240, and a network 250. Devices of environment 200 may interconnect via wired connections, wireless connections, or a combination of wired and wireless connections.

User device 210 may include one or more devices capable of receiving, generating, storing, processing, and/or providing a shopping tool and/or information associated with the shopping tool. For example, user device 210 may include a communication and/or computing device, such as a mobile phone (e.g., a smart phone, etc.), a laptop computer, a tablet computer, a handheld computer, a gaming device, a wearable communication device (e.g., a smart wristwatch, a pair of smart eyeglasses, etc.), or a similar type of device. User device 210 may transmit user device information, product search information, or the like, to inventory and transaction device 230, store server device 240, or another device. User device 210 may receive compatible product information, inventory information, security element deactivation information, or the like, from inventory and transaction device 230, store server device 240, or another device. In some implementations, user device 210 may broadcast a signal to and/or receive a signal from tag device 220 (e.g., a near field communication (NFC) signal, a Bluetooth signal, a ZigBee signal, a radio-frequency identification (RFID) signal, a Wi-Fi signal, etc.). In some implementations, user device 210 may provide a user interface for a shopping tool, and/or may facilitate user interaction with the shopping tool via the user interface (e.g., for a user to select, purchase, locate, etc., a product using the shopping tool).

Tag device 220 may include one or more devices capable of receiving, generating, storing, processing, and/or providing signals and/or information, such as information associated with a product. For example, tag device 220 may include an NFC device, a Bluetooth device, a ZigBee device, an RFID device, and/or another transponder-based device. In some implementations, tag device 220 may include a communication and/or computing device, such as a mobile phone (e.g., a smart phone, etc.), a laptop computer, a tablet computer, a handheld computer, a gaming device, a wearable communication device (e.g., a smart wristwatch, a pair of smart eyeglasses, etc.), or a similar type of device. In some implementations, tag device 220 may be attached to a product, located near a product, included in a product, a component of a product, or the like. In some implementations, tag device 220 may broadcast a tag signal to permit a device (e.g., user device 210, etc.) to locate tag device 220. In some implementations, tag device 220 may include a security element (e.g., a device to prevent a person from removing tag device 220 from a location, to sound an alarm when a person attempts to remove tag device 220 from the location, to perform an action when a person attempts to remove tag device 220 from the location, etc.). Tag device 220 may receive a signal to deactivate the security element, and may deactivate the security element based on the signal.

Inventory and transaction device 230 may include one or more devices capable of receiving, generating, storing, processing, and/or providing information. Inventory and transaction device 230 may receive information from and/or provide information to user device 210, tag device 220, and/or store server device 240 (e.g., inventory information, product search information, compatible product information, purchase information, etc.). In some implementations, inventory and transaction device 230 may determine and/or provide compatible product information based on product search information (e.g., by performing a search of locally stored inventory information, by causing a search of remotely stored inventory information to be performed, etc.). Inventory and transaction device 230 may facilitate purchasing of a selected product (e.g., by receiving, storing, determining, processing, and/or providing purchase information).

Store server device 240 may include one or more devices capable of receiving, generating, storing, processing, and/or providing inventory information (e.g., based on products available from a location associated with store server device 240). Store server device 240 may receive purchase information and/or may modify inventory information based on the purchase information (e.g., to remove information associated with a purchased product from the inventory information). In some implementations, store server device 240 may store, determine, and/or provide security element deactivation information (e.g., to user device 210, tag device 220, inventory and transaction device 230, or another device).

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
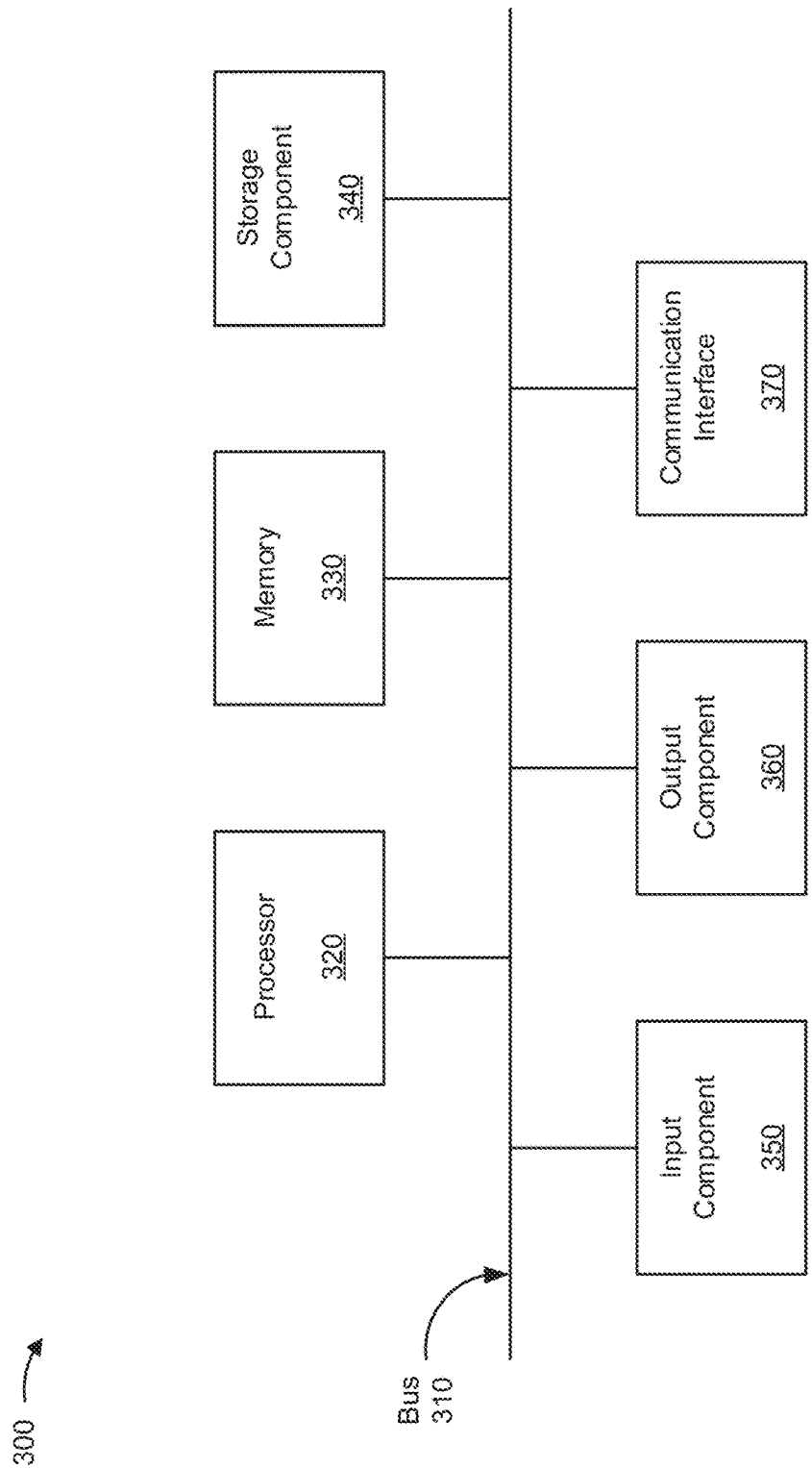
FIG. 3 is a diagram of example components of one or more devices of FIG. 2.

FIG. 3 is a diagram of example components of a device 300. Device 300 may correspond to user device 210, tag device 220, inventory and transaction device 230, and/or store server device 240. In some implementations, user device 210, tag device 220, inventory and transaction device 230, and/or store server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
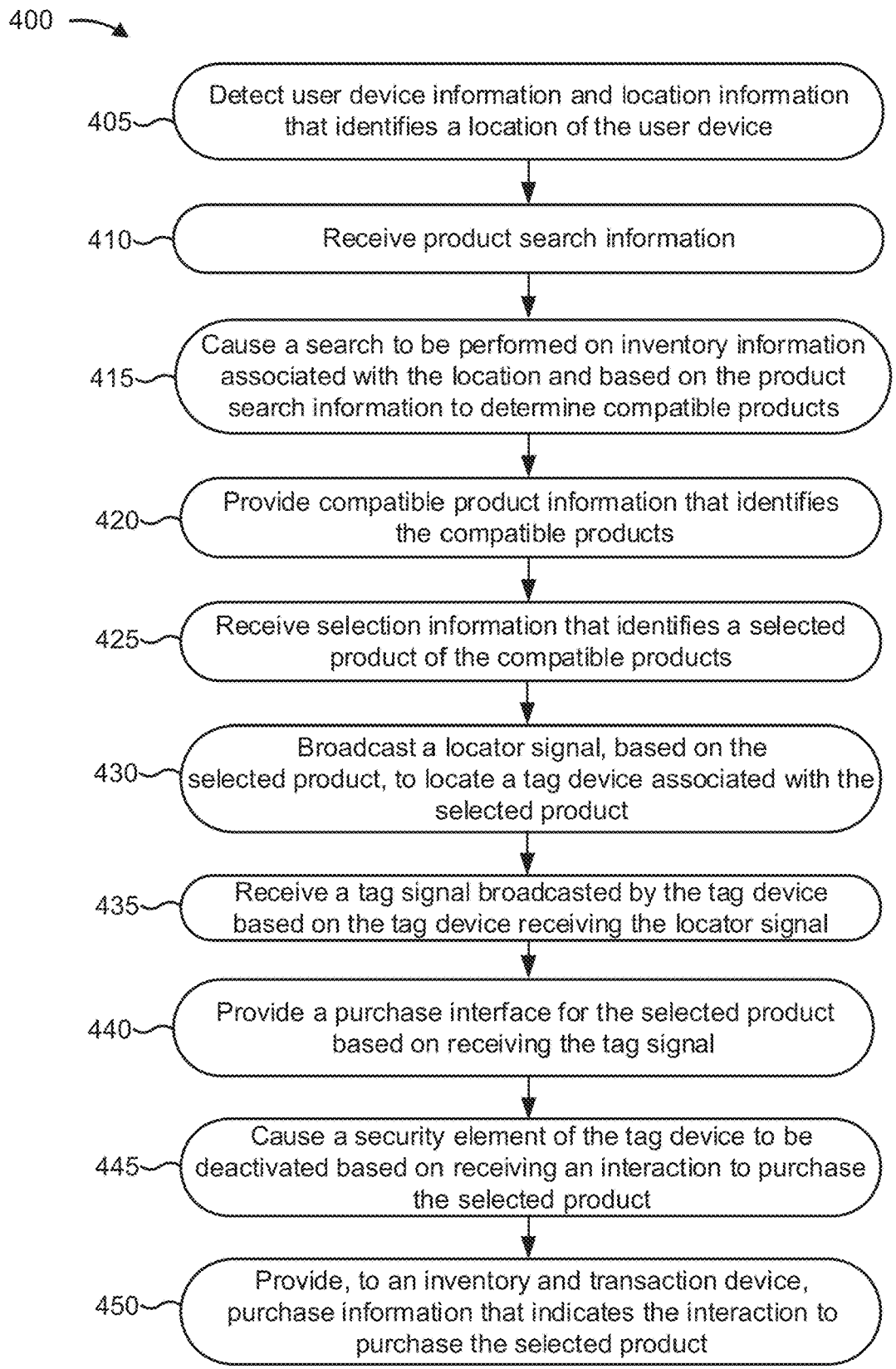
FIG. 4 is a flow chart of an example process for locating and/or purchasing a product using a shopping tool provided by a user device.

FIG. 4 is a flow chart of an example process 400 for locating and/or purchasing a product using a shopping tool provided by a user device. In some implementations, one or more process blocks of FIG. 4 may be performed by user device 210. In some implementations, one or more process blocks of FIG. 4 may be performed by another device or a set of devices separate from or including user device 210, such as tag device 220, inventory and transaction device 230, and/or store server device 240.

As shown in FIG. 4, process 400 may include detecting user device information and location information that identifies a location of the user device (block 405). For example, user device 210 may detect user device information and location information. The user device information may identify user device 210, and the location information may identify a location of user device 210. User device 210 may use the user device information and/or the location information to determine product search information, inventory information, or the like, and/or may provide the user device information and/or the location information to another device (e.g., inventory and transaction device 230, store server device 240, etc.).

The user device information may include information that identifies and/or describes user device 210. For example, the user device information may identify a type of user device 210 (e.g., a smart phone, a tablet computer, a laptop computer, etc.), a brand of user device 210, a model number associated with user device 210, a mobile device identifier associated with user device 210 (e.g., an international mobile station equipment identity (IMEI), an international mobile subscriber identity (IMSI), a mobile directory number (MDN), etc.), or the like.

User device 210, and/or another device (e.g., inventory and transaction device 230, store server device 240, etc.), may use the user device information to determine product search information, compatible product information, or the like. For example, assume that a user of user device 210 uses a shopping tool provided by user device 210 to cause user device 210 to perform a search for a smart phone case that is compatible with user device 210. In that case, user device 210 may provide user device information that identifies a type, a brand, and/or a model number associated with user device 210 (e.g., to facilitate selecting and/or locating a compatible smart phone case). User device 210, or another device, may determine compatible smart phone cases based on the user device information. In this way, user device 210 may determine product search information based on user device information, which may improve user experience and/or improve sales of accessory products related to user device 210.

The location information may identify a location of user device 210. User device 210 may determine the location information based on Global Positioning System (GPS) information that identifies the location, based on communicating with a device associated with the location (e.g., tag device 220, store server device 240, or another device associated with the location), or the like. The location may be associated with one or more products. For example, the location may be associated with a retail store, a mall kiosk, or the like, that offers the one or more products for sale. The one or more products offered for sale by the retail store, the mall kiosk, or the like, may be identified by inventory information that is stored by user device 210, inventory and transaction device 230, store server device 240, or the like.

In some implementations, user device 210 may determine the user device information and/or the location information automatically without user input. For example, user device 210 may automatically detect the user device information, may read a file stored by user device 210 that contains the user device information, or the like. User device 210 may determine the location information based on a GPS reading, from a location provided by a network that covers the location, or the like. Additionally, or alternatively, user device 210 may determine the user device information and/or the location information based on user input. For example, a user may provide location information via the shopping tool that indicates a location that the user intends to visit. In this way, a user of user device 210 may provide location information, which may allow the user to select a product offered for sale at the location before visiting the location.

In some implementations, the location may be associated with store server device 240. For example, store server device 240 may be a point of sale device located at the location, a server device used by a retail store associated with the location, or the like. Store server device 240 may store inventory information that describes and/or identifies products offered for sale, quantities of the products, prices associated with the products, descriptions of the products (e.g., information that describes the products for matching with product search information), or the like.

In some implementations, a first location may be associated with a first store server device 240-1, a second location may be associated with a second store server device 240-2, a third location may be associated with a third store server device 240-3, and so on. Store server device 240-1 may store inventory information associated with the first location, store server device 240-2 may store inventory information associated with the second location, store server device 240-3 may store inventory information associated with the third location, and so on. Inventory and transaction device 230 may route information (e.g., product search information, compatible product information, purchase information, etc.) to and/or from a particular one of store server devices 240-1, 240-2, and/or 240-3 based on a location of user device 210. For example, if user device 210 provides location information indicating that user device 210 is located at the second location, inventory and transaction device 230 may route information to and/or from store server device 240-2. In this way, inventory and transaction device 230 may facilitate operation of a shopping tool provided by user device 210 at a variety of locations and/or retailers.

As further shown in FIG. 4, process 400 may include receiving product search information (block 410). For example, user device 210 may receive product search information. The product search information may describe one or more criteria for determining compatible products. User device 210 and/or another device (e.g., inventory and transaction device 230, store server device 240, etc.) may use the product search information to determine compatible product information, which user device 210 may provide to a user (e.g., via a user interface associated with the shopping tool).

A product may be an object, a service, an area, or the like, that a provider may offer for sale, for rent, or the like. For example, the product may be goods offered for sale by a retail store, a mall kiosk, a grocery store, or the like (e.g., good related to user device 210, such as a phone case, a charger, a battery, etc., or goods unrelated to user device 210, such as clothing, personal accessories, food, drink, etc.), may be goods offered for rent by a provider (e.g., a rental car at a rental car lot, a rental device, etc.), may be a room offered for rent by a provider (e.g., a room in a hotel, in a motel, etc.), may be a service offered by a service provider (e.g., a service offered at a stand in a mall, in an airport, in a market, etc.), or the like.

The product search information may include one or more criteria that a device (e.g., user device 210, inventory and transaction device 230, store server device 240, etc.) may use to perform a search of inventory information to determine compatible products. In some implementations, the user may define the one or more criteria. For example, a user may select, from a group of criteria, the one or more criteria (e.g., to cause a search for a product based on criteria preferred by the user). In some implementations, a provider of user device 210 may define the one or more criteria. For example, the provider of user device 210 may want the user to purchase accessory products for user device 210, and may define one or more criteria to facilitate performing a search for and/or purchasing the accessory products. In some implementations, a provider of the shopping tool may define the one or more criteria. For example, the provider of the shopping tool may define one or more criteria to encourage a user to cause a search for products offered for sale by the provider of the shopping tool. In this way, the provider of the shopping tool may facilitate searching for particular products based on the one or more criteria.

In some implementations, user device 210 may define the one or more criteria based on a location of user device 210. For example, user device 210 may detect that user device 210 is located at a clothing store, and may define one or more criteria relevant to locating and/or purchasing clothing, based on user device 210 being located at the clothing store. As another example, user device 210 may detect that a particular location near user device 210 offers a promotion, and may define one or more criteria based on the location near user device 210 offering the promotion. In this way, user device 210 may define one or more criteria based on a location, which may allow a provider of user device 210 to improve sales of products located near user device 210 by modifying product search information based on the location.

In some implementations, user device 210 may define the one or more criteria based on user device information. For example, user device 210 may determine user device information that indicates that user device 210 is a particular brand of tablet computer. Based on the user device information, user device 210 may define the one or more criteria to facilitate locating accessory products for the particular brand of tablet computer. In this way, user device 210 may encourage a user to shop for products associated with user device 210, which may improve sales of the products associated with user device 210.

In some implementations, user device 210 may define the one or more criteria based on a combination of one or more of the above methods. For example, user device 210 may define the one or more criteria based on one or more of a user input, a provider of user device 210, a provider of the shopping tool, a location of user device 210, user device information, or the like. Additionally, or alternatively, user device 210 may define the one or more criteria based on all of the above methods.

In some implementations, user device 210 may determine product search information automatically without user input. For example, user device 210 may determine product search information automatically based on user device information. Additionally, or alternatively, user device 210 may determine product search information based on search history information associated with a user. For example, user device 210 may determine product search information indicating to cause a search for a particular price of product based on search history information indicating that a user of user device 210 previously provided product search information for the particular price of product. Additionally, or alternatively, user device 210 may determine product search information based on an input from another device (e.g., inventory and transaction device 230, store server device 240, etc.). For example, the other device may provide particular product search information in association with a promotion, an advertisement, or the like, which may enable the other device to cause a search to be performed for products based on the promotion, the advertisement, or the like.

In some implementations, user device 210 may determine product search information based on a user interaction. For example, a user of user device 210 may interact with a user interface of the shopping tool to provide the product search information, may upload the product search information to user device 210, may select a link that provides the product search information, or the like. In some implementations, user device 210 may determine product search information based on information provided by a user. For example, a user may provide an image of a product. User device 210 may determine product search information based on the image (e.g., based on a color of a product in the image, a shape of a product in the image, a texture of a product in the image, a pattern of a product in the image, a type of a product in the image, a brand of a product in the image, a model of a product in the image, or the like).

As further shown in FIG. 4, process 400 may include causing a search to be performed on inventory information associated with the location and based on the product search information to determine compatible products (block 415). For example, a device (e.g., user device 210, inventory and transaction device 230, store server device 240, etc.) may store inventory information associated with a location. User device 210 may cause a search of the inventory information to be performed, based on the product search information and/or based on the location information, to determine compatible products. User device 210 may provide compatible product information that describes the compatible products (e.g., for display to a user via a user interface associated with the shopping tool).

In some implementations, user device 210 may perform a search of locally stored inventory information. For example, a device (e.g., inventory and transaction device 230, store server device 240, etc.) may provide inventory information to user device 210. In such cases, user device 210 may locally store the inventory information, and may search locally stored inventory information. In some implementations, the device may determine that user device 210 is located at a particular location, and may provide inventory information associated with the particular location to user device 210. In this way, the device may improve performance of the shopping tool by enabling user device 210 to search inventory information stored locally by user device 210.

In some implementations, user device 210 may cause inventory and transaction device 230 to perform a search of inventory information. For example, user device 210 may provide the product search information to inventory and transaction device 230, and may cause inventory and transaction device 230 to perform the search of the inventory information. In some implementations, inventory and transaction device 230 may perform the search locally (e.g., may perform the search on locally stored inventory information). In other implementations, inventory and transaction device 230 may cause another device to perform the search. For example, inventory and transaction device 230 may cause store server device 240 to perform the search on inventory information stored by store server device 240.

In some implementations, inventory and transaction device 230 may search aggregated inventory information. For example, inventory and transaction device 230 may receive, aggregate, and/or locally store inventory information from multiple store server devices 240 associated with multiple locations. Inventory and transaction device 230 may perform a search of aggregated inventory information based on product search information and/or based on location information. For example, inventory and transaction device 230 may perform a search of locally stored inventory information associated with a particular location based on receiving location information that indicates the particular location. In this way, inventory and transaction device 230 may locally store and/or aggregate inventory information from multiple store server devices 240 and multiple locations, which may allow inventory and transaction device 230 to more efficiently determine compatible products. Further, inventory and transaction device 230 may determine analytic information related to aggregated inventory information and/or product search information, which inventory and transaction device 230 may provide to another party (e.g., a provider of user device 210, of the shopping tool, of the multiple locations, or the like).

In some implementations, user device 210 may determine and/or perform a search of inventory information based on tag device 220. For example, user device 210 may determine inventory information based on tag device 220. In some implementations, user device 210 may detect multiple tag devices 220, and may receive information describing multiple products associated with the multiple tag devices 220 (e.g., based on the multiple tag devices 220 providing the information describing the multiple products). User device 210 may store and/or perform a search of the information describing the multiple products. In this way, user device 210 may determine and/or search inventory information from tag device 220, which may reduce processing and/or storage requirements of inventory and transaction device 230 and/or store server device 240.

As further shown in FIG. 4, process 400 may include providing compatible product information that identifies the compatible products (block 420). For example, based on causing the search to be performed to determine the compatible products, user device 210 may provide compatible product information that identifies the compatible products. In some implementations, user device 210 may provide the compatible product information for display (e.g., to a user via a user interface of the shopping tool). In some implementations, client device 210 may provide the compatible product information to another device (e.g., inventory and transaction device 230, store server device 240, etc.). Client device 210 may use the compatible product information to determine a selected product.

In some implementations, user device 210 may provide the compatible product information to a user of user device 210. For example, user device 210 may provide the compatible product information for display via an interface (e.g., as a list of search results, etc.). In some implementations, the compatible product information may describe the compatible products based on the product search information. For example, based on the one or more criteria of the product search information, user device 210 may provide compatible product information that describes values of the one or more criteria for the compatible products (e.g., based on a user providing product search information for a particular color of a product, user device 210 may provide information identifying colors of compatible products, such as words that describe the colors, images that show the colors, or the like).

In some implementations, user device 210 may provide the compatible product information to another device (e.g., inventory and transaction device 230, store server device 240, etc.) to facilitate targeted advertising. For example, user device 210 may provide the compatible product information to inventory and transaction device 230. Based on the compatible product information, inventory and transaction device 230 may determine one or more advertisements to provide for display to a user of user device 210 (e.g., to encourage the user to purchase one or more of the compatible products). In this way, user device 210 may facilitate targeted advertising using a shopping tool, which may improve sales of the compatible products.

As further shown in FIG. 4, process 400 may include receiving selection information that identifies a selected product of the compatible products (block 425). For example, user device 210 may provide the compatible product information (e.g., to a user of user device 210) via a user interface to facilitate selecting a compatible product. User device 210 may receive selection information that identifies one or more selected products of the compatible products (e.g., based on a user interaction with the user interface, etc.). The user may select the one or more selected products for locating and/or purchasing.

In some implementations, user device 210 may receive the selection information automatically without user input. For example, user device 210 may determine the selection information based on an instruction stored by user device 210. In some implementations, the instruction may be provided by a user of user device 210. For example, the user may provide an instruction indicating that user device 210 is to automatically select a first compatible product of the compatible products, a compatible product associated with a lowest price, a compatible product that matches the product search information more closely than other products, or the like. In some implementations, user device 210 may select a compatible product based on an instruction provided by another entity. For example, an entity associated with a retail store, a mall kiosk, a provider of user device 210, a provider of the shopping tool, or the like, may provide an instruction for selecting the compatible product. User device 210 may select the compatible product based on the instruction, which may enable user device 210 to facilitate a promotion, an advertisement, or the like.

In some implementations, the selection information may identify a single selected product. For example, a user of user device 210 may select a single selected product, and the selection information may identify the single selected product. In other implementations, the selection information may identify multiple selected products. For example, the selection information may indicate multiple products related to a particular product, an accessory product related to the particular product, a list of products (e.g., a list provided by a user as a shopping list, etc.), or the like. In some implementations, the compatible product information may identify related products, accessory products, or the like, and the shopping tool may facilitate a user interaction to select the related products, accessory products, or the like. In this way, user device 210 may facilitate selection and/or purchasing of multiple products, which may increase sales of the multiple products.

As further shown in FIG. 4, process 400 may include broadcasting a locator signal, based on the selected product, to locate a tag device associated with the selected product (block 430). For example, user device 210 may broadcast a locator signal, based on the selected product, to locate one or more tag devices 220. Tag device 220 may be associated with (e.g., attached to, located near, included in, a component of, etc.) the selected product. User device 210 may broadcast the locator signal to cause tag device 220 to broadcast a tag signal upon receiving the locator signal. Based on the locator signal and/or based on the tag signal, user device 210 may locate tag device 220 and/or the selected product, to guide a user of user device 210 to the selected product.

The locator signal may include an NFC signal, a Bluetooth signal, a ZigBee signal, an RFID signal, a Wi-Fi signal, or the like. In short, the locator signal may be of a type that facilitates locating tag device 220. In some implementations, the locator signal may be a short range signal (e.g., may broadcast to a ten-foot range, a thirty-foot range, a range confined to a particular retail store, or the like) that broadcasts within a short range. Based on receiving a tag signal from tag device 220, user device 210 may determine that tag device 220 is within the short range, and may locate tag device 220.

In some implementations, user device 210 may broadcast the locator signal continuously. In other implementations, user device 210 may broadcast the locator signal intermittently (e.g., every five seconds, every thirty seconds, based on a user interaction to cause user device 210 to broadcast the locator signal, or the like). By providing the locator signal intermittently, user device 210 may conserve battery power and/or reduce interference from multiple user devices 210 broadcasting multiple locator signals.

In some implementations, tag device 220 may be attached to a product, in close proximity to the product, included in the product, or the like. For example, tag device 220 may be attached to an article of clothing, included in a box of an electronic product, located on a shelf next to the selected product, or the like. Additionally, or alternatively, a selected product may function as tag device 220. For example, a smart phone may perform the operations performed by tag device 220 (e.g., the smart phone may receive the locator signal, may broadcast a tag signal based on receiving the locator signal, may deactivate a security element based on security element deactivation information and/or purchase information, etc.). In this way, a product may function as tag device 220, which may reduce a quantity of tag devices 220 required by a location.

As further shown in FIG. 4, process 400 may include receiving a tag signal broadcasted by the tag device based on the tag device receiving the locator signal (block 435). For example, user device 210 may receive a tag signal from tag device 220 (e.g., a tag device 220 associated with the selected product). Tag device 220 may broadcast the tag signal based on receiving a locator signal from user device 210. User device 210 may locate tag device 220 based on the tag signal in order to guide a user of user device 210 to tag device 220 and/or the selected product.

The tag signal may include an NFC signal, a Bluetooth signal, a ZigBee signal, an RFID signal, a Wi-Fi signal, or another type of signal. In short, the tag signal may be of a type that facilitates locating tag device 220. In some implementations, the tag signal may be a short range signal that broadcasts within a short range (e.g., may broadcast to a ten-foot range, a thirty-foot range, a range confined to boundaries of a particular location, or the like).

In some implementations, user device 210 may guide the user to tag device 220. For example, based on receiving the tag signal, user device 210 may provide a map that indicates a location of tag device 220. In some implementations, the map may guide the user to tag device 220 (e.g., may indicate a route to tag device 220, etc.). Additionally, or alternatively, user device 210 may provide feedback to guide the user to tag device 220. For example, user device 210 may vibrate (e.g., with increasing frequency) as user device 210 approaches tag device 220, may provide audio feedback (e.g., pings of increasing frequency, etc.) as user device 210 approaches tag device 220, or the like.

In some implementations, user device 210 may provide images, videos, augmented reality interfaces, or the like, to guide the user to tag device 220. For example, tag device 220 may provide an image of a retail store that indicates a particular shelf that holds tag device 220, may provide a video that demonstrates a location of tag device 220, may modify a video feed captured by user device 210 to indicate tag device 220, may modify a video feed captured by user device 210 to indicate a route to the particular shelf that holds tag device 220, or the like. In this way, user device 210 may provide an image, a video, an augmented reality interface, or the like, to guide user device 210 to the selected product, which may improve user experience and/or increase sales of selected products.

In some implementations, user device 210 may guide the user to multiple tag devices 220 and/or multiple selected products. For example, based on the user selecting multiple products, user device 210 may guide the user to multiple selected products. In some implementations, user device 210 may determine a route for the user, to improve efficiency of locating and/or purchasing the multiple selected products. In some implementations, user device 210 may guide a user to related products, accessory products, or the like, which may encourage the user to purchase the related products, accessory products, or the like.

In some implementations, tag device 220 may aid in guiding a user to a selected product. For example, tag device 220 may cause a light-emitting diode near and/or attached to the selected product to emit light, may cause a sound to be produced near the selected product, may cause the selected product to perform an action (e.g., may illuminate a screen of a smart phone, may cause the smart phone to ring and/or vibrate, etc.), or the like. In this way, tag device 220 may aid in guiding the user to the selected product, which may be helpful when a user purchases one of multiple similar products, when the user has trouble locating the selected product, or the like.

In some implementations, user device 210 may locate and/or guide a user to a product based on a search history, a search on a different device, or the like. For example, assume that user device 210 causes a search to be performed for a particular product, and assume that user device 210 determines no compatible products associated with a first location. Assume further that user device 210 stores search history information that describes the particular product, and that user device 210 moves to a second location that associated with a compatible product. User device 210 may receive a tag signal at the second location from a tag device 220 associated with the compatible product. In that case, user device 210 may notify a user, may guide the user to the compatible product, and/or may provide a purchase interface for the compatible product at the second location. In this way, user device 210 may guide a user to a product based on search history information, which may improve sales of the product.

As another example, assume that a user is associated with two user devices (e.g., user device 210-1 and user device 210-2). Assume that the user inputs product search information to user device 210-1, and that user device 210-1 fails to locate a compatible product at a first location. Assume further that user device 210-2 receives the product search information (e.g., based on user device 210-1 providing the product search information to user device 210-2). User device 210-2 may determine a compatible product based on the product search information. For example, the user may bring user device 210-2 to a second location that stocks the compatible product, and user device 210-2 may locate the compatible product, may guide the user to the compatible product, and/or may provide a purchase interface to purchase the compatible product.

As further shown in FIG. 4, process 400 may include providing a purchase interface for the selected product based on receiving the tag signal (block 440). For example, user device 210 may guide the user to the selected product based on receiving the tag signal, and/or may provide a purchase interface (e.g., via a user interface of the shopping tool) to permit the user to purchase the selected product. By guiding the user to the selected product and/or providing the purchase interface, user device 210 may enable the user to view, handle, and/or test the selected product before purchasing the selected product. Further, the user may be able to purchase the selected product via the interface without interacting with a worker.

In some implementations, the purchase interface may provide advertising and/or promotional content. For example, user device 210 may receive advertising and/or promotional content (e.g., from a provider associated with user device 210, associated with the shopping tool, associated with the location, etc.). The advertising and/or promotional content may identify reduced prices, related products, package deals, or the like. User device 210 may provide the advertising and/or promotional content to a user of user device 210 via the purchase interface. For example, the advertising and/or promotional content may be provided in association with a purchase interface for the selected product, in association with a list of compatible products, or the like.

In some implementations, the purchase interface may display information based on a location of user device 210. For example, assume that a mall kiosk offers a promotion of smart phone accessories. Assume further that user device 210 is located near the mall kiosk. In some implementations, user device 210 may provide, via the purchase interface, information related to the promotion. For example, user device 210 may provide, to a user shopping for a product other than the smart phone accessories, the information related to the promotion of the smart phone accessories. In this way, user device 210 may encourage a user to buy products based on user device 210 being located near the products, which may increase sales of the products.

In some implementations, user device 210 may receive an interaction to purchase the selected product. For example, a user of user device 210 may interact with the purchase interface to cause user device 210 to purchase the selected product. Additionally, or alternatively, user device 210 may receive interactions to cause user device 210 to purchase multiple selected products. For example, the user of user device 210 may cause user device 210 to purchase multiple selected products (e.g., by selecting the multiple selected products from a list of compatible products, by using a shopping cart feature of the shopping tool, or the like). Additionally, or alternatively, user device 210 may receive an interaction to cause user device 210 to buy related products. For example, user device 210 may provide a purchase interface for related products, and may receive a user interaction with the interface to cause user device 210 to purchase one or more of the related products.

As further shown in FIG. 4, process 400 may include causing a security element of the tag device to be deactivated based on receiving an interaction to purchase the selected product (block 445). For example, user device 210 may receive an interaction (e.g., a user interaction with a user interface of the shopping tool) to purchase the selected product. Based on the interaction, user device 210 may cause a security element of tag device 220 to be deactivated. In some implementations, user device 210 may cause tag device 220 to deactivate the security element. User device

210 may cause the security element to be deactivated to enable a user of user device 210 to purchase and/or remove the selected product from the location (e.g., the retail store, the mall kiosk, etc.) without interacting with a worker and without setting off a security alarm.

In some implementations, user device 210 may receive security element deactivation information to deactivate the security element. For example, tag device 220 may require a credential (e.g., a password, a username, a cryptographic security key, etc.) to deactivate the security element. Another device (e.g., inventory and transaction device 230, store server device 240, etc.) may store the credential and/or may provide the credential to user device 210 based on user device 210 receiving the interaction to purchase the product. User device 210 may cause tag device 220 to deactivate the security element based on the credential. In this way, user device 210 may improve security of the location and reduce a quantity of workers required to deactivate the security element by using security element deactivation information to cause tag device 220 to deactivate the security element.

In some implementations, user device 210 may cause the security element to be deactivated by causing modification of information stored by tag device 220 and/or the security element. For example, tag device 220 and/or the security element may store a flag, a bit, a variable, or the like, that indicates that the security element is active. User device 210 may provide information indicating to modify the flag, the bit, the variable, or the like, to deactivate the security element. For example, user device 210 may cause a first value of the flag, the bit, the variable, or the like, to be modified to a second value that indicates that the security element is deactivated. In this way, user device 210 may cause the security element to be deactivated by causing modification of information stored by tag device 220 and/or the security element, which may reduce processing load on store server device 240.

In some implementations, a location security device may cause the security element to be deactivated. For example, assume that a location includes a location security device (e.g., a security device situated at an exit of the location, etc.) that detects when an active security element is removed from the location. Assume further that user device 210 provides, to the location security device, information indicating that user device 210 purchased a product associated with a particular security element. As a user associated with user device 210 removes the product from the location, the location security device may detect the particular security element and may deactivate the particular security element based on the information indicating that user device 210 purchased the product associated with the particular security element.

In some implementations, user device 210 may provide information indicating that user device 210 purchased one of a type of product associated with a security element. Based on detecting the security element associated with the type of product, a location security device may deactivate the security element. In this way, user device 210 may cause deactivation of a security element associated with one of a type of a product, which may allow a user of user device 210 to select the one of the type of product without knowing an exact identity of the one of the type of product (e.g., the user may purchase a gallon of milk, and may select any gallon of milk from a refrigerator that contains multiple gallons of milk).

In some implementations, user device 210 may cause tag device 220 to deactivate the security element by broadcasting a deactivation signal. For example, user device 210 may broadcast a deactivation signal (e.g., an NFC signal, a Bluetooth signal, a ZigBee signal, an RFID signal, a Wi-Fi signal, etc.) to cause tag device 220 to deactivate the security element. In some implementations, the deactivation signal may include security element deactivation information (e.g., security element deactivation information required by tag device 220 to deactivate the security element). In this way, user device 210 may cause tag device 220 to deactivate the security element by broadcasting a signal, which may improve a user experience by not requiring the user to interact with a device and/or worker to deactivate the security element.

As further shown in FIG. 4, process 400 may include providing, to an inventory and transaction device, purchase information that indicates the interaction to purchase the selected product (block 450). For example, user device 210 may receive an interaction to purchase a selected product. Based on the interaction to purchase the selected product, user device 210 may provide purchase information to inventory and transaction device 230. Inventory and transaction device 230 may perform one or more actions to facilitate the purchase based on the purchase information, which may eliminate a need of a user of user device 210 to interact with a worker.

In some implementations, the purchase information may include information that identifies the selected product, a price of the selected product, payment information to pay for the selected product, a location of the selected product, inventory information that describes and/or identifies the selected product, or the like. Based on the purchase information, in some implementations, inventory and transaction device 230 may perform one or more actions. For example, inventory and transaction device 230 may charge an account (or cause an account to be charged) associated with the user and/or user device 210, may update inventory information based on the purchase information, may cause another device (e.g., store server device 240, etc.) to update inventory information, may notify an entity associated with the location (e.g., the retail store, the mall kiosk, etc.) of the purchase information, or the like.

In some implementations, user device 210 and/or inventory and transaction device 230 may provide the purchase information to store server device 240. For example, store server device 240 may store inventory information. Based on the user purchasing the selected product, user device 210 and/or inventory and transaction device 230 may provide the purchase information to store server device 240 (e.g., to permit store server device 240 to update the inventory information, etc.). In this way, user device 210 may facilitate selection and/or purchasing of a product from a location and/or may guide a user of user device 210 to the product without interacting with workers associated with the location.

As an example, a user of user device 210 may provide input to select a selected product. User device 210 may locate the selected product based on broadcasting locator signals to and/or receiving tag signals from a tag device 220 associated with the selected product. After locating the selected product, user device 210 may guide the user to the selected product. The user may handle, test, etc. the selected product, and may interact with a purchase interface provided by user device 210 to purchase the selected product. After the user interacts with the user interface to purchase the selected product, user device 210 may cause a security element associated with the selected product to be deactivated, and may provide purchase information to inventory and transaction device 230. Based on the security element being deactivated, and based on the purchase information being provided to inventory and transaction device 230, the user may leave the location with the product. The user may not be required to interact with workers of the location (e.g., to locate the product, to deactivate the security element, and/or to purchase the product) based on user device 210 providing the purchase interface, causing the security element to be deactivated, and/or guiding the user to the product.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are diagrams of an example implementation 500 relating to example process 400 shown in FIG. 4. FIGS. 5A-5D show an example of locating and/or purchasing a product using a shopping tool provided by a user device. For the purpose of FIGS. 5A-5D, assume that store server device 240 stores inventory information identifying products located at Retail Store 1. Assume further that each of the products located at Retail Store 1 is associated with a different tag device 220 based on the respective tag devices 220 being attached to the products. Assume that the tag devices 220 include security elements that prevent a person from leaving Retail Store 1 with a product until tag device 220 deactivates the security element attached to the product.

Figure 5A:
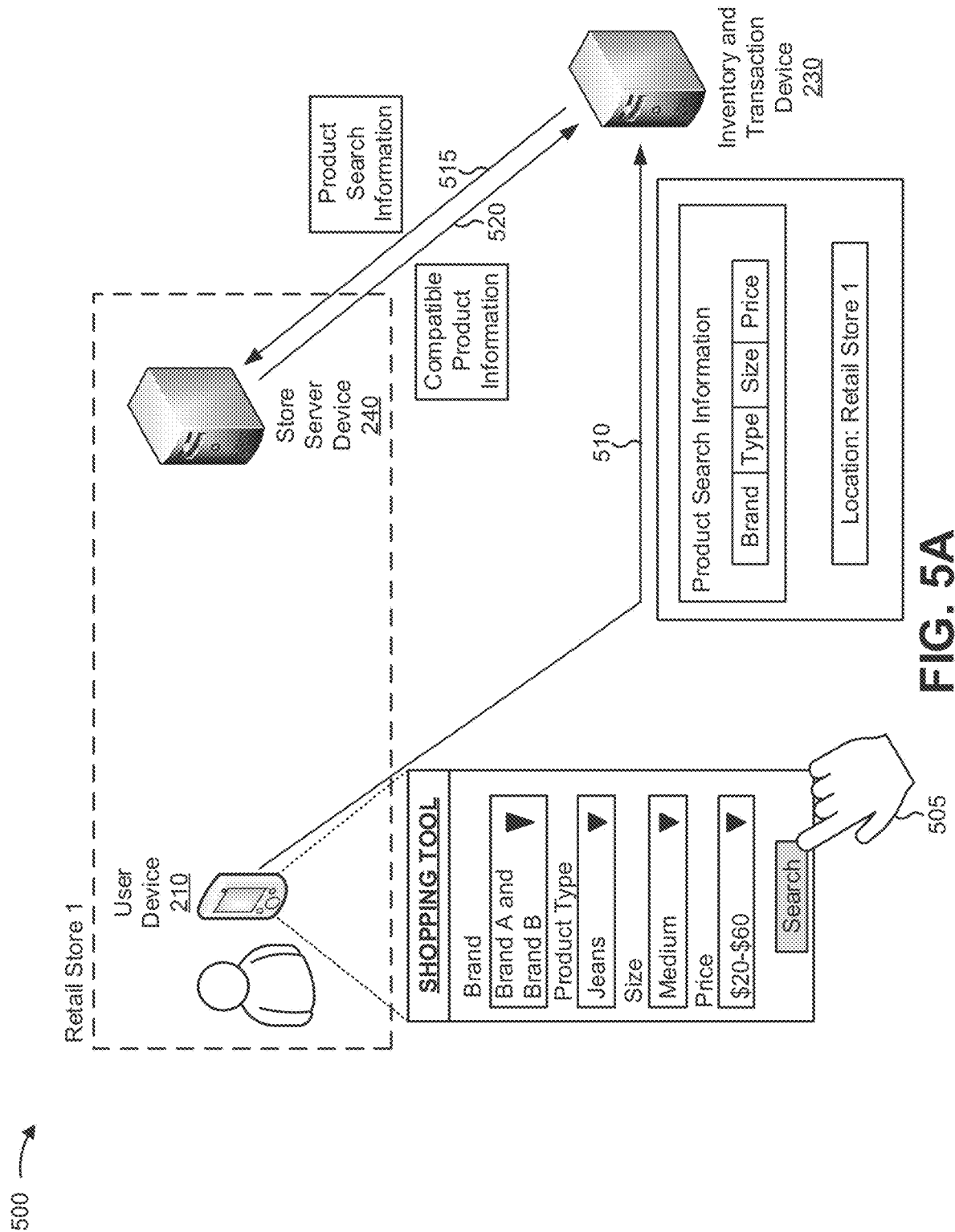
FIGS. 5A-5D are diagrams of an example implementation relating to the example process shown in FIG. 4.

As shown in FIG. 5A, user device 210 may provide a user interface for a shopping tool. As further shown, the user interface may receive product search information (e.g., information identifying brands of "Brand A" and "Brand B," a product type of "jeans," a size of "medium," and a price range of "$20-$60"). As shown by reference number 505, user device 210 may receive an interaction with the user interface to cause a search to be performed based on the product search information.

As shown by reference number 510, user device 210 may provide the product search information to inventory and transaction device 230. As further shown, user device 210 may provide location information identifying a location of user device 210 (e.g., "Location: Retail Store 1"). As shown by reference number 515, inventory and transaction device 230 may provide the product search information to store server device 240. Assume that inventory and transaction device 230 provides the product search information to cause store server device 240 to perform a search to determine compatible products based on the product search information. Assume further that inventory and transaction device 230 provides the product search information to store server device 240 based on store server device 240 being associated with Retail Store 1, where user device 210 is located. Assume that store server device 240 determines compatible products by performing a search of locally stored inventory information. As shown by reference number 520, store server device 240 may provide, to inventory and transaction device 230, compatible product information. Assume that the compatible product information identifies and/or describes the compatible products.

Figure 5B:
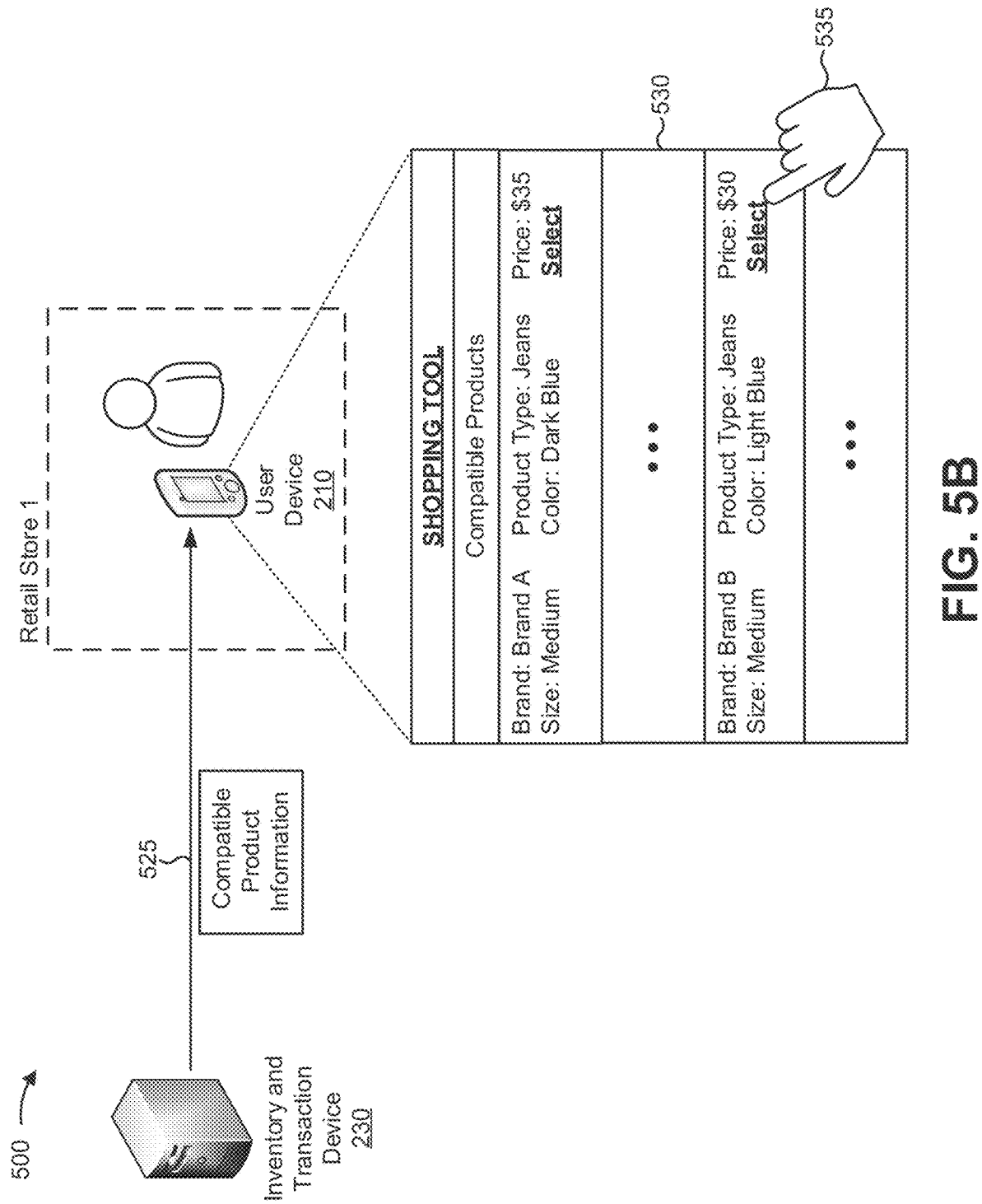

As shown in FIG. 5B, and by reference number 525, inventory and transaction device 230 may provide the compatible product information to user device 210. As shown by reference number 530, user device 210 may provide, to a user and for display via the user interface of the shopping tool, the compatible product information. Here, user device 210 displays the compatible product information as a list identifying and/or describing the compatible products. As shown by reference number 535, user device 210 may receive an interaction with the user interface to select a selected product of the compatible products.

Figure 5C:
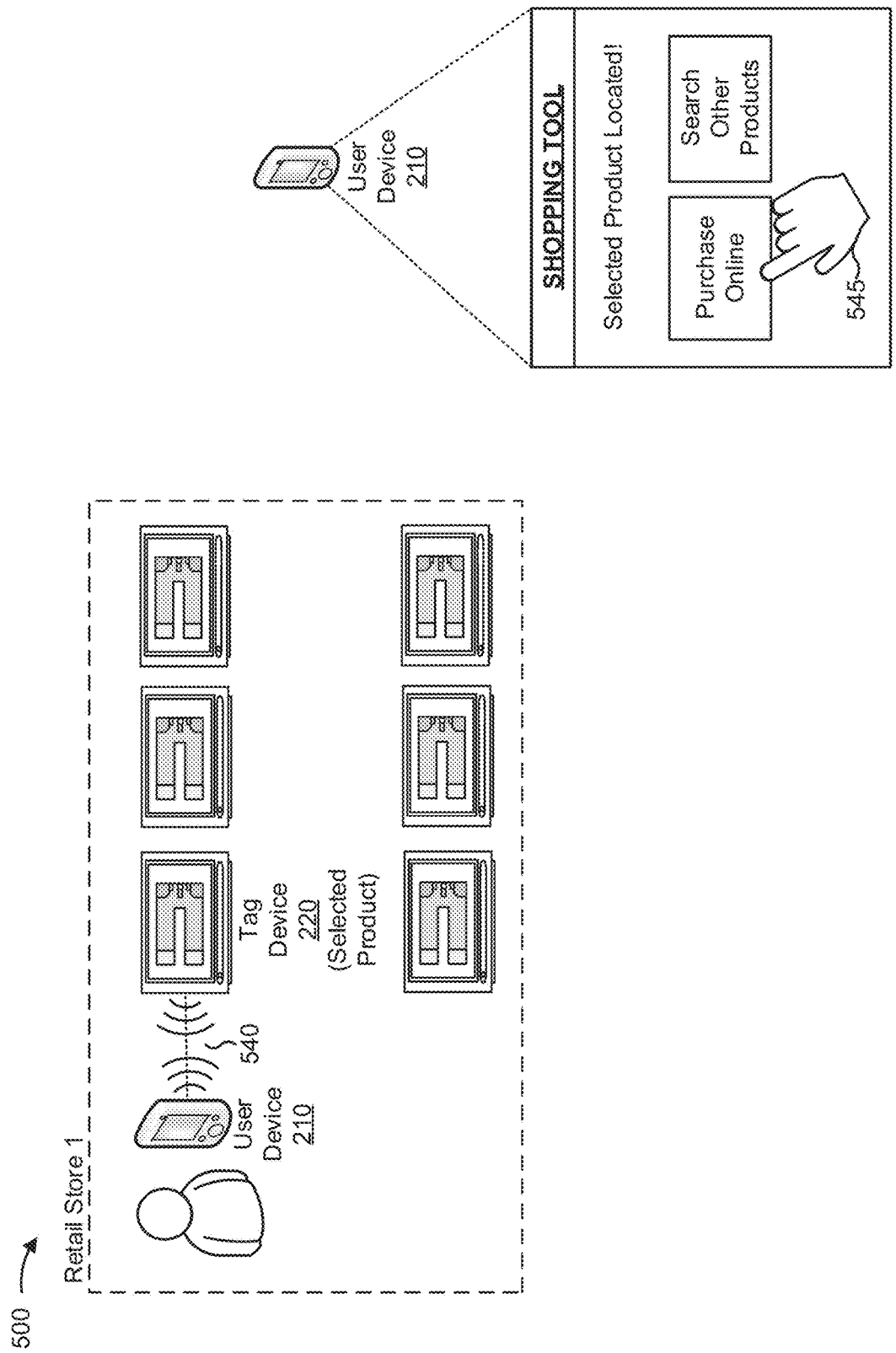

For the purpose of FIG. 5C, assume that user device 210 intermittently broadcasts locator signals, and assume that tag device 220, associated with the selected product, broadcasts tag signals based on receiving the locator signals. As shown in FIG. 5C, and by reference number 540, user device 210 may locate tag device 220 based on receiving the tag signals from tag device 220. Assume that user device 210 guides the user to the selected product based on locating tag device 220 (e.g., by providing a map that indicates a location of tag device 220 and/or the selected product). As shown, user device 210 may provide, for display and via a user interface of the shopping tool, a purchase interface to facilitate purchasing the selected product. Assume that user device 210 provides the purchase interface based on user device 210 locating the selected product. As shown by reference number 545, user device 210 may receive an interaction to purchase the selected product (e.g., shown as an interaction with a "Purchase online" button). Assume that user device 210 provides purchase information to inventory and transaction device 230 based on receiving the interaction to purchase the selected product.

Figure 5D:
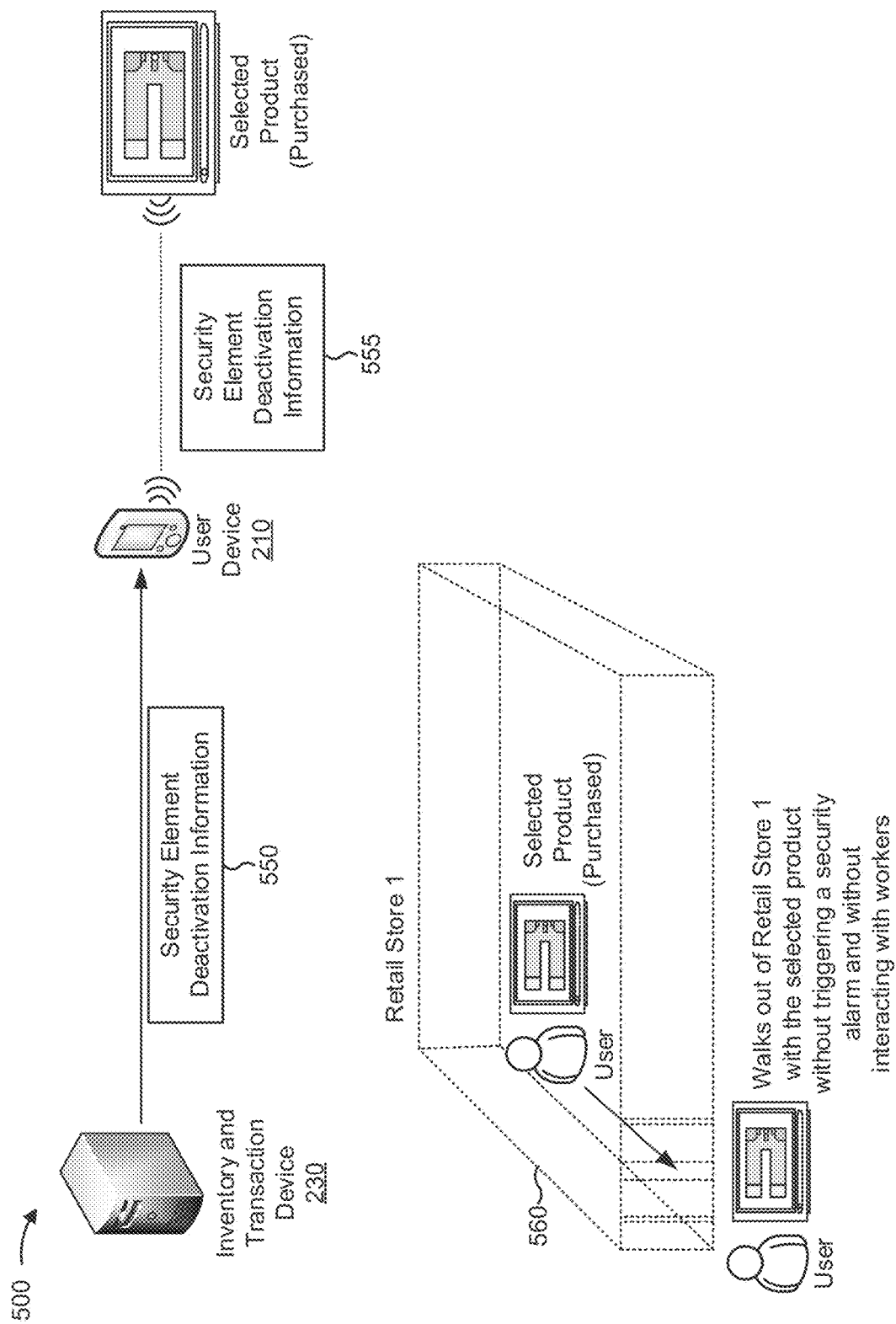

As shown in FIG. 5D, and by reference number 550, inventory and transaction device 230 may provide, to user device 210, security element deactivation information. Assume that inventory and transaction device 230 receives the security element deactivation information from store server device 240 based on receiving the purchase information. As shown by reference number 555, assume that user device 210 provides the security element deactivation information to tag device 220 to cause tag device 220 to deactivate a security element associated with tag device 220. Assume that user device 210 provides the security element deactivation information to tag device 220 by broadcasting a short range signal. As shown by reference number 560, after user device 210 causes tag device 220 to deactivate the security element, the user may retrieve the selected product. The user and the selected product may leave Retail Store 1, without triggering a security alarm and without interacting with workers of Retail Store 1.

As indicated above, FIGS. 5A-5D are provided merely as an example. Other examples are possible and may differ from what was described with regard to FIGS. 5A-5D.

In this way, a user device may guide a user in a retail store to locate and/or purchase a selected product using a shopping tool and based on broadcasted signals. By enabling the user to search for and/or select the selected product via a user interface of the user device, the user device may provide an additional vector via which to provide advertisements and/or promotions to the user. By guiding the user to locate and/or purchase the selected product, the user device may reduce a quantity of retail store workers required to guide the user to locate and/or purchase the selected product.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a textbased user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  detect first location information indicating a first location of the device;
  determine one or more criteria based on detecting the first location information, wherein the one or more criteria includes at least one of:
    a type of store, or
    a store location, located within a proximate distance to the device, offering a promotion;
  provide, via a first user interface, product search information based on the one or more criteria,
    wherein the product search information includes two or more of:
      a brand selection menu,
      a product selection menu,
      a color selection menu, or
      a price selection menu;
  receive the product search information for searching inventory information associated with the first location,
    the inventory information including information regarding one or more products;
  cause a search of the inventory information associated with the first location and at least one other location to be performed to determine one or more compatible products of the one or more products,
    the search being performed based on the product search information;
  determine that the one or more compatible products of the one or more products are not found at the first location;
  store a search history associated with the one or more compatible products of the one or more products when the one or more compatible products are not found at the first location;
  detect second location information associated with a second location of the device,
    the second location being associated with the one or more compatible products stored in the search history;
  receive a tag signal at the second location from a tag device associated with the one or more compatible products stored in the search history,
    the tag device being used to guide a user to a physical location of the one or more compatible products;
  provide, via a second user interface, a list of the one or more compatible products that are associated with the second location;
  receive an interaction with the second user interface indicating that a particular compatible product on the list of the one or more compatible products is selected;
  provide, via a third user interface, a map based on the physical location of the one or more compatible products,
    the map guiding the user to the one or more compatible products,
    the map including a predetermined route for the user based on locations of the one or more compatible products;
  provide feedback to guide the user to the tag device, the feedback including at least one of:
vibrations,
audio feedback, or
visual feedback,
the feedback increasing with intensity as the device approaches the tag device;
determine one or more selected products of the one or more compatible products,
the one or more selected products being selected for purchasing;
provide, via a fourth user interface, purchase information associated with the one or more selected products,
the purchase information being provided based on the one or more selected products being located; and
provide, to a location security device, information indicating that the user has purchased one of a particular product of the one or more selected products associated with a particular security element to cause the location security device to deactivate the particular security element when the user removes the one of the particular product of the one or more selected products from the second location,
the particular product of the one or more selected products being selected from a plurality of matching products,
the plurality of matching products including identical security elements, and
the user to select any one of the plurality of matching products.

2. The device of claim 1, where the one or more processors are further to:
provide information to guide the user to the physical location of the tag device.

3. The device of claim 1, where the one or more processors are further to:
receive the inventory information based on the first location information; and
store the inventory information as locally stored inventory information; and
where the one or more processors, when causing the search to be performed, are further to:
cause the search to be performed on the locally stored inventory information.

4. The device of claim 1, where the inventory information is stored by a store server device; and
where the one or more processors, when providing the purchase information, are further to:
provide the purchase information to the store server device to cause the store server device to update the inventory information based on the purchase information.

5. The device of claim 1, where the one or more processors are further to:
detect device information that describes the device; and
provide an advertisement via the second user interface,
the advertisement being provided based on at least one of the device information, the first location information, the product search information, or the list of the one or more compatible products.

6. The device of claim 1, where the one or more processors, when receiving the tag signal at the second location from the tag device, are further to:
receive the tag signal based on at least one of:
a near field communication signal,
a radio-frequency identification signal,
a Bluetooth signal,
a ZigBee signal, or
a WiFi signal,
transmitted to or received from the tag device.

7. A non-transitory computer-readable medium storing instructions, the instructions comprising:
one or more instructions that, when executed by one or more processors of a device, cause the one or more processors to:
determine first location information describing a first location of the device;
determine one or more criteria based on detecting the first location information, wherein the one or more criteria includes at least one of:
a type of store, or
a store location, located within a proximate distance to the device, offering a promotion;
provide, via a first user interface, product search information based on the one or more criteria,
wherein the product search information includes two or more of:
a brand selection menu,
a product selection menu,
a color selection menu, or
a price selection menu;
determine the product search information for searching inventory information associated with the first location and at least one other location,
the inventory information identifying one or more products offered for sale at the first location;
determine compatible product information based on the inventory information and based on the product search information,
the compatible product information identifying one or more compatible products of the one or more products offered for sale;
determine that the one or more compatible products are not found at the first location;
store a search history associated with the one or more compatible products of the one or more products when the one or more compatible products are not found at the first location;
detect second location information associated with a second location of the device,
the second location being associated with the one or more compatible products stored in the search history;
receive a tag signal at the second location from a tag device associated with the one or more compatible products stored in the search history,
the tag device being used to guide a user to a physical location of the one or more compatible products;
provide, via a second user interface, a list of the one or more compatible products that are associated with the second location;
receive an interaction with the second user interface indicating that a particular compatible product on the list of the one or more compatible products is selected;
provide, via a third user interface, a map based on the physical location of the one or more compatible products,
the map guiding the user to the one or more compatible products, the map including a predetermined route for the user based on locations of the one or more compatible products;
provide feedback to guide the user to the tag device, the feedback including at least one of:
vibrations,
audio feedback, or
visual feedback,
the feedback increasing with intensity as the device approaches the tag device;
determine one or more selected products of the one or more compatible products,
the one or more selected products being selected for purchasing;
provide, via a fourth user interface, purchase information associated with the one or more selected products,
the purchase information being provided based on the one or more selected products being located; and
provide, to a location security device, information indicating that the user has purchased one of a particular product of the one or more selected products associated with a particular security element to cause the location security device to deactivate the particular security element when the user removes the one of the particular product of the one or more selected products from the second location,
the particular product of the one or more selected products being selected from a plurality of matching products,
the plurality of matching products including identical security elements, and
the user to select any one of the plurality of matching products.

8. The non-transitory computer-readable medium of claim 7, where the one or more instructions, that cause the one or more processors to determine the product search information, further cause the one or more processors to:
determine device information that describes the device; and
determine the product search information based on the device information,
the product search information causing a search to be performed at the first location for products related to the device information.

9. The non-transitory computer-readable medium of claim 7, where the one or more instructions, when executed by the one or more processors, further cause the one or more processors to:
store, locally, the inventory information to generate locally stored inventory information; and
where the one or more instructions, that cause the one or more processors to determine the compatible product information, further cause the one or more processors to:
determine the compatible product information based on the locally stored inventory information.

10. The non-transitory computer-readable medium of claim 7, where the one or more instructions, that cause the one or more processors to provide the purchase information, further cause the one or more processors to:
cause the inventory information to be updated based on the purchase information.

11. A method, comprising:
determining, by a device, first location information indicating a first location of the device,
the first location being associated with one or more products;
determining, by the device, one or more criteria based on detecting the first location information,
wherein the one or more criteria includes at least one of:
a type of store,
a store location, located within a proximate distance to the device, offering a promotion;
providing, by the device and via a first user interface, product search information based on the one or more criteria,
wherein the product search information includes two or more of:
a brand selection menu,
a product selection menu,
a color selection menu, or
a price selection menu;
receiving or determining, by the device, the product search information,
causing, by the device, a search of inventory information associated with the first location and at least one other location to be performed to determine one or more compatible products,
the inventory information identifying the one or more products, and
the search being performed based on the product search information;
providing, by the device, compatible product information that identifies the one or more compatible products;
storing, by the device, a search history associated with the one or more compatible products of the one or more products when the one or more compatible products are not found at the first location;
detecting, by the device, second location information associated with a second location of the device,
the second location being associated with the one or more compatible products stored in the search history;
receiving, by the device, a tag signal at the second location from a tag device associated with the one or more compatible products stored in the search history,
the tag device being used to guide a user to a physical location of the one or more compatible products;
providing, by the device and via a second user interface, a list of the one or more compatible products that are associated with the second location;
receiving, by the device, an interaction with the second user interface indicating that a particular compatible product on the list of the one or more compatible products is selected;
providing, by the device and via a third user interface, a map based on the physical location of the one or more compatible products,
the map guiding the user to the one or more compatible products,
the map including a predetermined route for the user based on locations of the one or more compatible products;
providing, by the device, feedback to guide the user to the tag device,
the feedback including at least one of:
vibrations,
audio feedback, or
visual feedback,
the feedback increasing with intensity as the device approaches the tag device;

determining, by the device, one or more selected products of the one or more compatible products,
the one or more selected products being selected for purchasing;
providing, by the device and via a fourth user interface, purchase information associated with the one or more selected products,
the purchase information being provided based on the one or more selected products being located; and
providing, by the device and to a location security device, information indicating that the user has purchased one of a particular product of the one or more selected products associated with a particular security element to cause the location security device to deactivate the particular security element when the user removes the one of the particular product of the one or more selected products from the second location,
the particular product of the one or more selected products being selected from a plurality of matching products,
the plurality of matching products including identical security elements, and
the user to select any one of the plurality of matching products.

12. The method of claim 11, further comprising:
receiving the inventory information,
the inventory information being received based on the first location of the device;
storing, locally, the inventory information as locally stored inventory information; and
the method, when causing the search to be performed at the first location, further comprises:
performing the search of the locally stored inventory information.

13. The method of claim 11, where the tag device is at least one of attached to, included in, or a component of the one or more selected products.

14. The method of claim 11, further comprising:
determining device information that describes the device;
receiving an advertisement based on at least one of the device information, the first location information, or the product search information; and
the method, when providing the compatible product information, further comprises:
providing the advertisement in association with the compatible product information.

15. The method of claim 11, where receiving the tag signal at the second location from the tag device further comprises:
receiving the tag signal based on at least one of:
a near field communication signal,
a radio-frequency identification signal,
a Bluetooth signal,
a ZigBee signal, or
a WiFi signal being transmitted to or received from the tag device.

16. The device of claim 1, where the particular security element is deactivated when the location security device detects the particular security element at an exit of the second location.

17. The non-transitory computer-readable medium of claim 7, where the one or more instructions, that cause the one or more processors to receive the tag signal at the second location from the tag device, further cause the one or more processors to:
receive the tag signal based on at least one of:
a near field communication signal,
a radio-frequency identification signal,
a Bluetooth signal,
a ZigBee signal, or
a WiFi signal being transmitted to or received from the tag device.

18. The method of claim 11, where the particular security element is deactivated when the location security device detects the particular security element at an exit of the second location.

19. The device of claim 1, where the visual feedback includes at least one of:
an image,
a video, and
an augmented reality interface.

20. The non-transitory computer-readable medium of claim 7, where the one or more instructions, that cause the one or more processors to cause the location security device to deactivate the particular security element, causes the one or more processors to:
cause the location security device to deactivate the particular security element based on one or more credentials.

* * * * *